April 20, 1954  C. O. MERCHANT  2,675,719
MACHINE FOR FORMING AN ABRADING SURFACE
ON THE PERIPHERAL SURFACE OF A WHEEL
Filed April 27, 1948   8 Sheets-Sheet 5

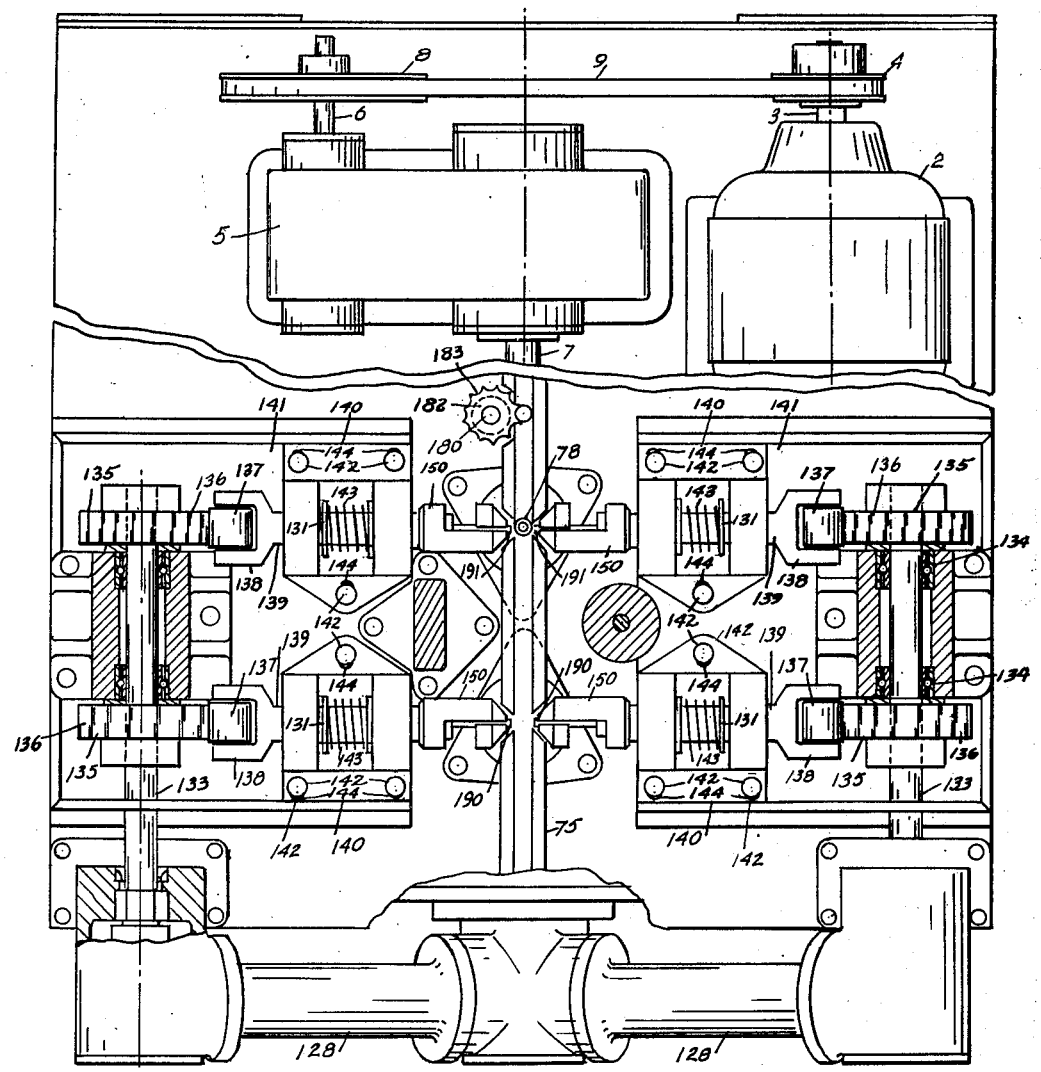

INVENTOR.
Chester O. Merchant
BY
Florian L. Miller
Atty

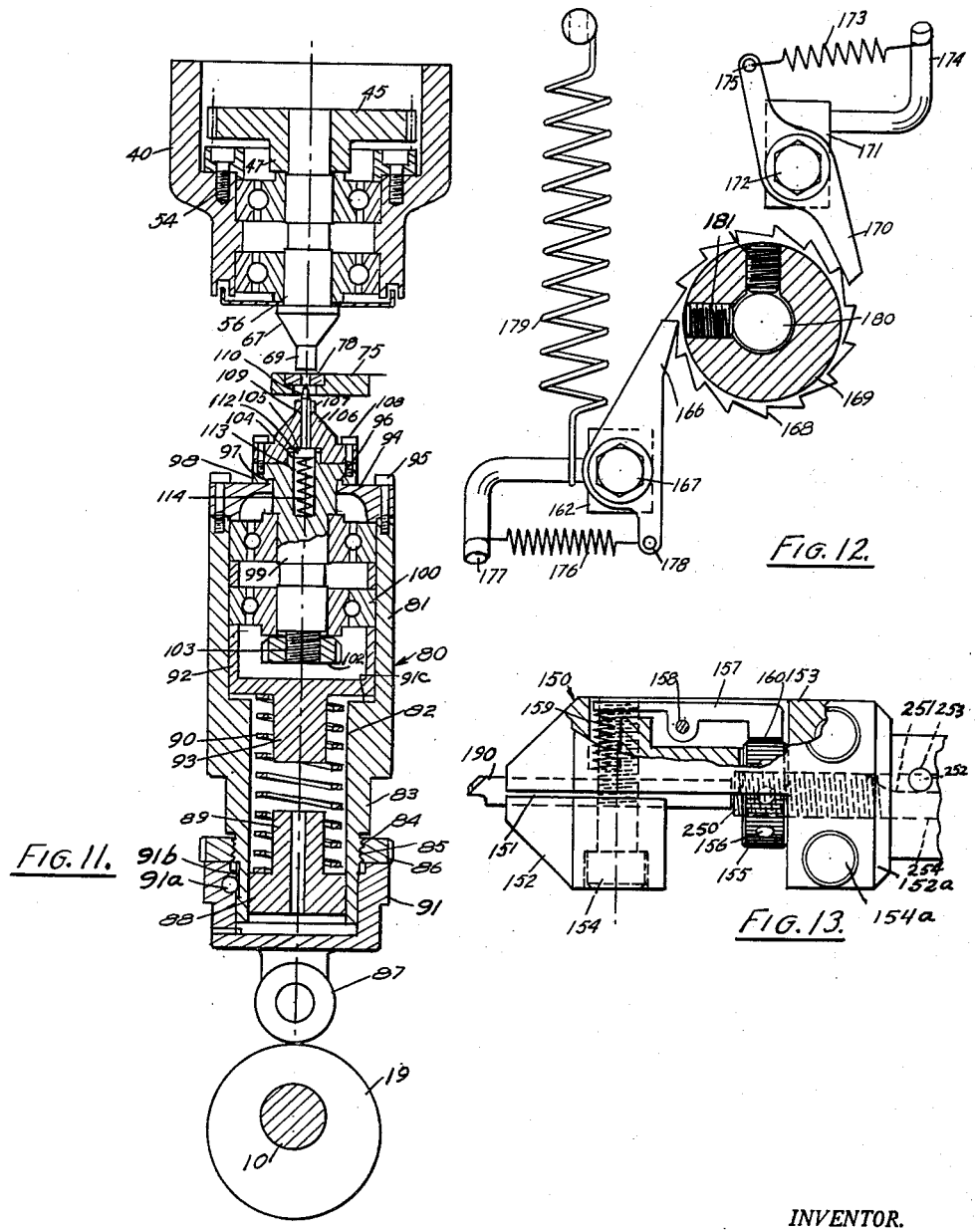

INVENTOR.
Chester O. Merchant
BY
Florian G. Miller
Atty.

April 20, 1954
C. O. MERCHANT
2,675,719
MACHINE FOR FORMING AN ABRADING SURFACE
ON THE PERIPHERAL SURFACE OF A WHEEL
Filed April 27, 1948
8 Sheets-Sheet 8
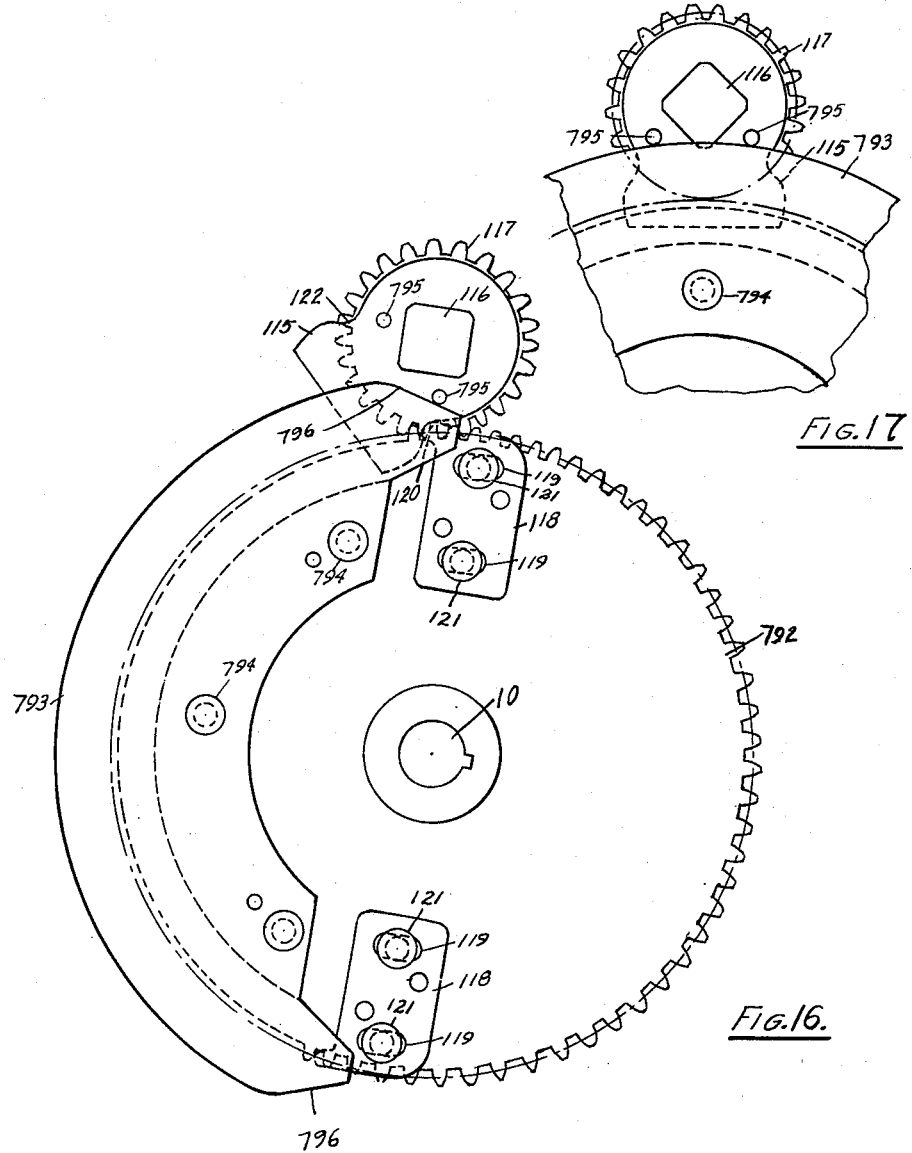
INVENTOR.
Chester O. Merchant
BY
Florian J. Miller
Atty.

Patented Apr. 20, 1954

2,675,719

UNITED STATES PATENT OFFICE 2,675,719

MACHINE FOR FORMING AN ABRADING SURFACE ON THE PERIPHERAL SURFACE OF A WHEEL

Chester O. Merchant, Erie, Pa., assignor, by mesne assignments, to George G. Blaisdell, doing business as Zira Laboratories, Bradford, Pa.

Application April 27, 1948, Serial No. 23,425

5 Claims. (Cl. 78—45)

This invention relates generally to machines for grooving the peripheral surfaces of metal wheels and more particularly to machines for forming an abrading surface on the periphery of a metal wheel or disc.

Many attempts have been made heretofore to provide an abrading surface on the periphery of metal discs or wheels by production processes but none of these devices have provided a satisfactory abrading surface on the periphery of the wheel nor have any continuous production lines methods heretofore been provided to automatically form an abrading surface on the periphery of a wheel at a high production rate and without any manual intervention. Different types of turning lathes, screw machines, and other machine tools have been utilized to form an abrading surface on metal wheels or discs but in the process of chucking, grooving, cutting off, etc. production is extremely slow with the result that the manufacture of these wheels has been the most costly operation in making an item such as a cigarette lighter. Furthermore, it has been practically impossible to control the depth of the grooves with any degree of accuracy thereby providing an inefficient abrading surface in most instances. None of these prior devices have provided a means of forming an abrading surface on the periphery of a metal disc wherein the depth of the individual cross grooves may be varied and the depths thereof predetermined.

It is, accordingly, an object of my invention to provide a method and machine for forming an abrading surface on the periphery of a metal disc or wheel, which overcomes the above and other defects in present methods and machines for forming such a surface on the wheel and it is more particularly an object of my invention to provide a machine for forming an abrading surface on the periphery of metal discs or wheels which is efficient in operation, economical in manufacture, high in production and automatic in operation.

Another object of my invention is to provide a machine for forming an abrading surface on the periphery of metal discs wherein the depth of the cuts of the abrading surface may be varied and predetermined.

Another object of my invention is to provide a machine for forming an abrading surface on the periphery of metal discs wherein the discs are moved continuously along a track and one or more grooving operations are performed on the pheriphery of the discs as they pass one or more stations in the machine.

Another object of my invention is to provide a machine for forming an abrading surface on the periphery of metal discs wherein metal cutting or grooving members are reciprocated intermittently while the metal discs are rotated a predetermined time.

Another object of my invention is to provide a novel machine for forming an abrading surface on the periphery of metal discs wherein novel cam operated mechanism are provided along with mechanism for intermittently operating the rotating and cutting devices.

Another object of my invention is to provide a novel machine for forming an abrading surface on the periphery of metal discs wherein novel means are provided for feeding the metal discs along a track continuously into predetermined positions to be rotated and grooved.

Another object of my invention is to provide a novel method of forming an abrading surface on the periphery of a metal disc.

Other objects of my invention will become evident from the following detailed description, taken in conjunction with the accompanying drawings, in which:

Fig. 4 is a plan view with parts thereof in section of my novel machine;

Fig. 5 is a more or less diagrammatic view of cutter members at the first station of my novel machine;

Fig. 6 is a side elevational view of the metal wheel which has been grooved by the cutter members shown in Fig. 5;

Fig. 7 is a more or less diagrammatic view of the cutter members at the second station in my machine;

Fig. 8 is a side elevational view of a metal wheel which has been progressively grooved by the cutters shown in Figs. 5 and 7;

Fig. 8a is a more or less diagrammatic view of my novel cutter members off-set from each other;

Fig. 11 is a fragmentary transverse vertical sectional view taken through the parts of my machine for rotating the metal disc and for moving it upwardly to an operative position;

Fig. 12 is a fragmentary plan view showing the escapement mechanism for rotating the feeding device of the metal discs in my novel machine;

Fig. 13 is an enlarged fragmentary side elevational view with the parts broken away of the adjustable chuck of my novel machine for holding the cutter members;

Fig. 16 is a more or less diagrammatic view of the intermittent gears for intermittently operating the cutter members of my novel machine; and Fig. 17 is a fragmentary view showing the dwell member and the pins on the cam member in engagement.

For illustrative purposes, I have shown a machine for forming an abrading surface on the periphery of a metal wheel for use in frictionally engaging the flint in a cigarette or cigar lighter. Many variations of my device may be made for providing any type of a grooved surface on the periphery of a metal wheel or disc.

Figure 1:
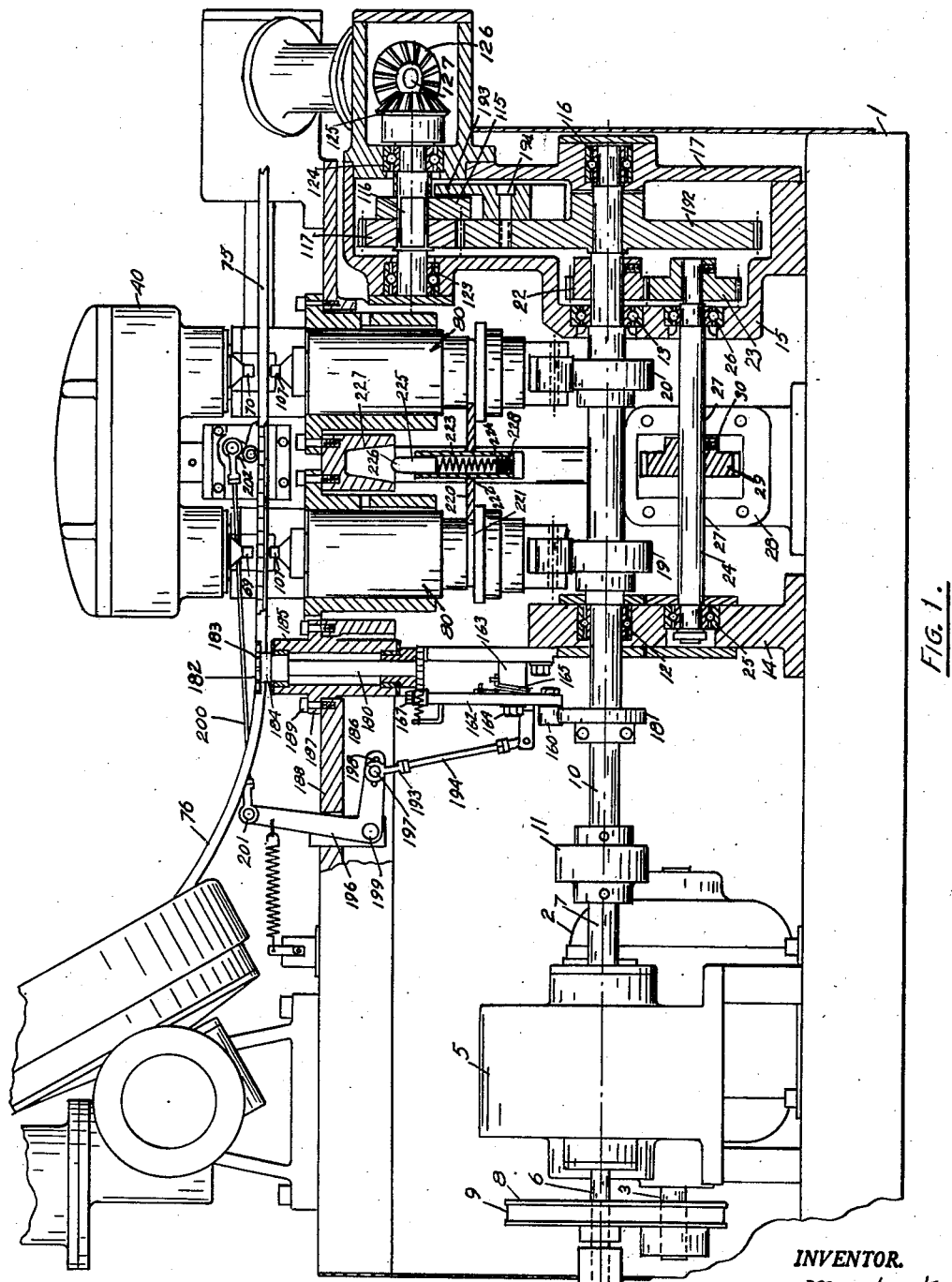
Fig. 1 is a vertical sectional view of my novel machine for forming an abrading surface on the periphery of a metal wheel.

Referring now to the drawings, I show in Fig. 1 a base 1 having mounted thereon a motor 2 with a shaft 3 and a pulley 4, and a gear housing 5 having offset, oppositely outwardly extending shafts 6 and 7, the shaft 6 having a pulley 8 which is driven by a belt or chain 9 trained over the pulleys 4 and 8. The shaft 7 is connected to a longitudinally extending shaft 10 by a suitable coupling 11. The shaft 10 is journalled in bearings 12 and 13 in the side frame members 14 and 15 and bearing 16 in the side frame member 17. The shaft 10 has cams 18, 19 and 20 fixedly mounted thereon and spaced from each other for purposes which will be hereinafter described.

Figure 3:
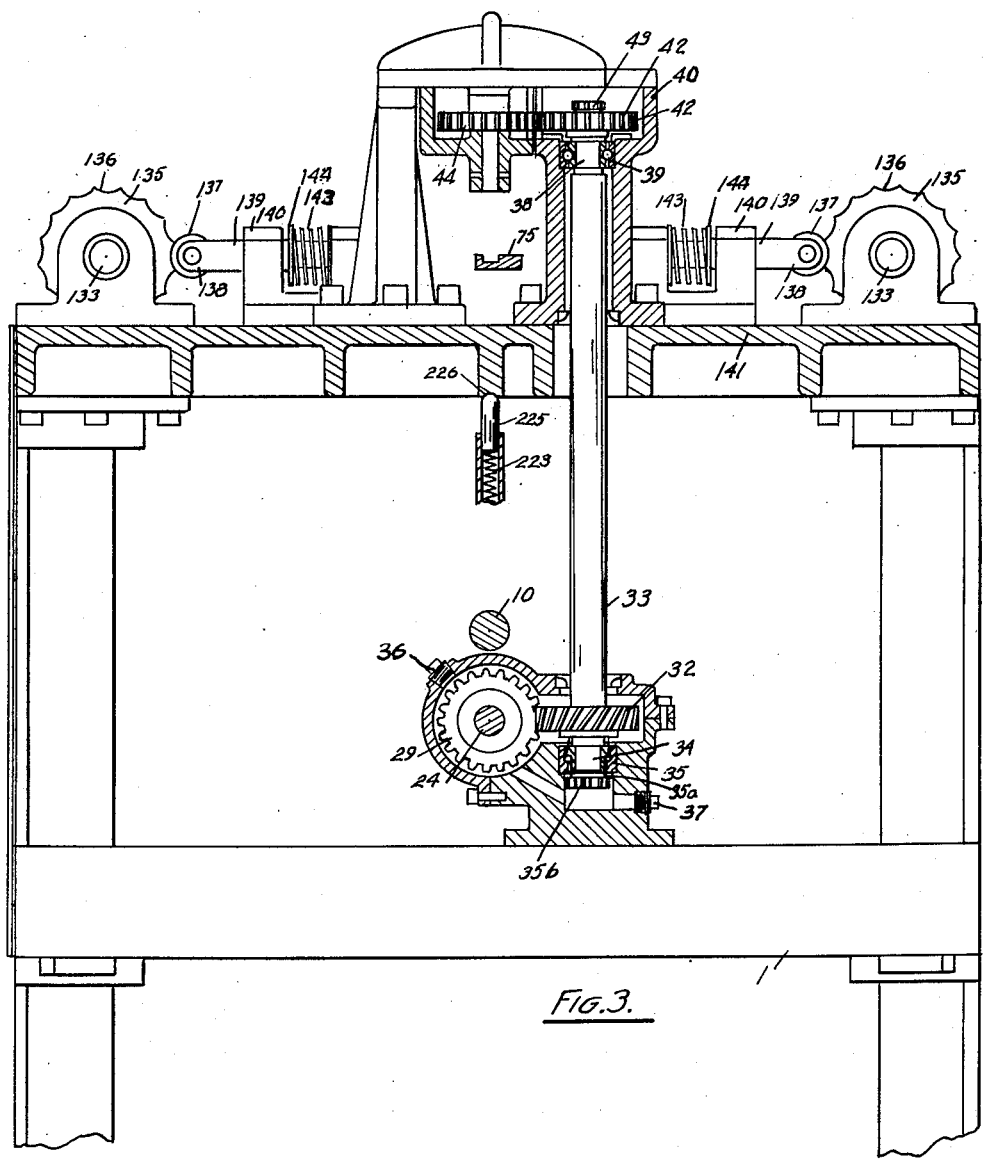
Fig. 3 is a transverse vertical sectional view of my machine.
Figure 9:
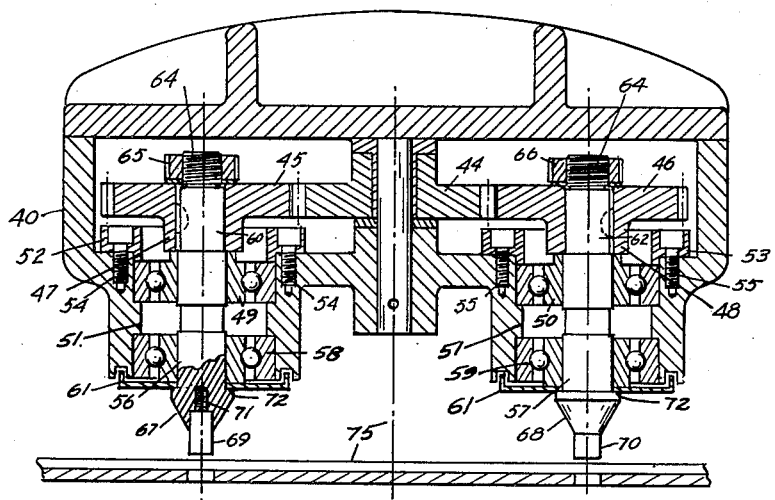
Fig. 9 is a transverse vertical sectional view taken on the line 9—9 of Fig. 10.
Figures 10A, 10B:
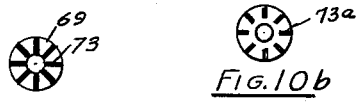
Fig. 10a is a bottom view of the wheel engaging members showing the cleats thereon.
Fig. 10b is a bottom view of the wheel engaging members showing shortened cleats thereon.
Figure 10:
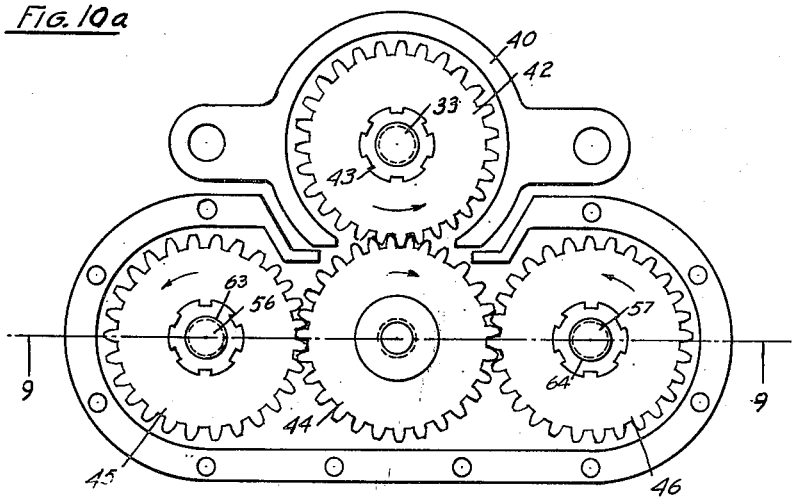
Fig. 10 is a plan view of the gear housing in Fig. 9 with the cover removed.
Figure 14:
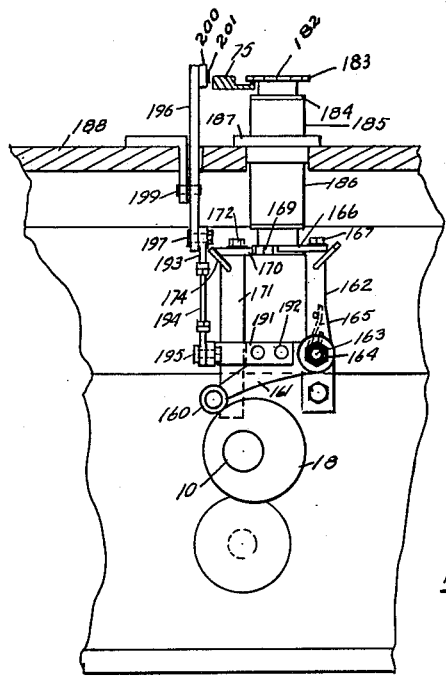
Fig. 14 is a fragmentary side elevational view showing the mechanism for rotating the feeding device to move the metal wheels along the track in my novel machine into operative position.

The shaft 10 has a driving gear 22 fixedly mounted thereon in engagement with a driven gear 23 fixedly mounted on a counter shaft 24 journalled in bearings 25 and 26 in the side frame members 14 and 15. The shaft 24 extends through apertures 27 in a gear casing 28 which is mounted on the base 1. A spiral gear 29 is fixed to the shaft 24 and mounted thereon centrally of the casing 28 by set screw 30. In Fig. 3, I particularly show the spiral gear 29 in engagement with spiral gear 32 disposed at right angles thereto and mounted on a vertically extending shaft 33, the reduced bottom portion 34 thereof being journalled in a thrust bearing 35. The spiral gear 32 and bearing 35 are secured on the end of the shaft 33 by a washer 35a and a threaded member 35b. Screw caps 36 and 37 in the housing 28 provide for admission of a lubricant thereto. The upper reduced portion 38 of the shaft 33 is journalled in the bearing 39 in gear housing 40 and a spur gear 42 is mounted on the upper end of the shaft 33 and secured thereto by threaded member 43. The spur gear 42 meshes with gear 44 (Figs. 9 and 10) which in turn meshes with oppositely disposed gears 45 and 46. The gears 45 and 46 have hub portions 47 and 48 which seat on thrust bearings 49 and 50. The bearings 49 and 50 seat on shoulders 51 and are held in place by annular rings 52 and 53 secured by screw bolts 54 and 55. The gears 45 and 46 are mounted on the reduced portions 60 and 62 of the shafts 56 and 57, the ends 63 and 64 thereof being threaded for receiving washer and nut assemblies 65 and 66. The lower ends of the shafts 56 and 57 have inverted frusto-conical shaped heads 67 and 68 with axially extending threaded counterbored recesses 71 for threadably engaging gripping members 69 and 70 for engaging wheels movable along a track 75 to rotate them in unison with the rotation of the shafts 56 and 57. The gripping members 69 and 70 have spuds or cleats 73 to frictionally engage a wheel 78. The lower ends of the shafts 56 and 57 are supported by bearings 58 and 59 which in turn are supported by flanged disc members 61 mounted on shoulders 72 formed on the shafts 56 and 57. Fig. 10b shows shortened cleats 73a.

An open track 75 runs longitudinally of my novel machine in alignment with the rotatable heads 67 and 68 on the shafts 56 and 57. The track 75 is preferably directed angularly upwardly at 76 wherein it is in a position to receive selected metal wheels or discs from a conventional hopper type selector which disposes the discs into the track 75 singly and successively in a flat position.

To raise the wheels or discs 78 from the track 75 to engage the gripping members 69 and 70, I have provided two reciprocating members 80, one of which is shown particularly in Fig. 11. The members 80 are reciprocated by the cams 19 and 20 on the shaft 10. The members 80 are alike and each comprises a cylindrical member 81 with an internally reduced portion 82 and a reduced outer portion 83 threaded at 84 to receive the internally threaded portion 85 of a threaded abutting member 86. Cup shaped cap members 91 are mounted on the lower end of the member 81 and it has mounted thereon cam rollers 87 for engagement with the cams 19 and 20 on the shaft 10. The caps 91 are secured by ball member 91a engaging a slot 91b in the member 81. A cylindrical member 88 with a reduced portion 89 is disposed in the reduced portion 82 of the cylindrical member 81 and it nests a coil spring 90. A cylindrically shaped member 92 has a reduced portion 93 which extends into the opposite end of the coil spring 90 and is resiliently supported thereby and engageable with a shoulder 91c in the member 81. A cap member 94 is secured on the upper end of the cylindrical member 81 by screw bolts 95, the cap member 94 having an upwardly extending marginal flange 96 for receiving the grooved portion 97 of the flanged head 98 of a depending shaft 99. A bearing member 100 is mounted on the lower end of the shaft 99 and secured thereto by a nut 102 in engagement with the reduced threaded end 103 of the shaft 99. The shaft 99 has an upwardly extending flange 104 for receiving the bored portion 105 of head 106. The head 106 is substantially frusto-conical in shape and has an outwardly extending nose 107. The head 106 is secured to the flanged portion 98 of the shaft 99 by screw bolts 108. The head 106 has an aperture 109 extending therethrough to receive a guiding pin 110. The guiding pin 110 has an enlarged headed portion 112 on the lower end thereof which is guided in an axially extending cylindrical bore 113 in the upper end of the shaft 99 and it is engaged by a spring 114 which urges the pin 110 upwardly to a position as shown in Fig. 11. As will be noted in Fig. 11, the engaging member 106 moves upwardly upon each rotation of the cams 19 and 20 and engages a wheel 78 in the track 75 and forces it into engagement with a gripping member 69 or 70 thereby causing rotation of the wheel 78 for a predetermined period of time or the time that the high points on the cams 19 and 20 are in engagement with the cam rollers 87 of the members 80.

Figure 2:
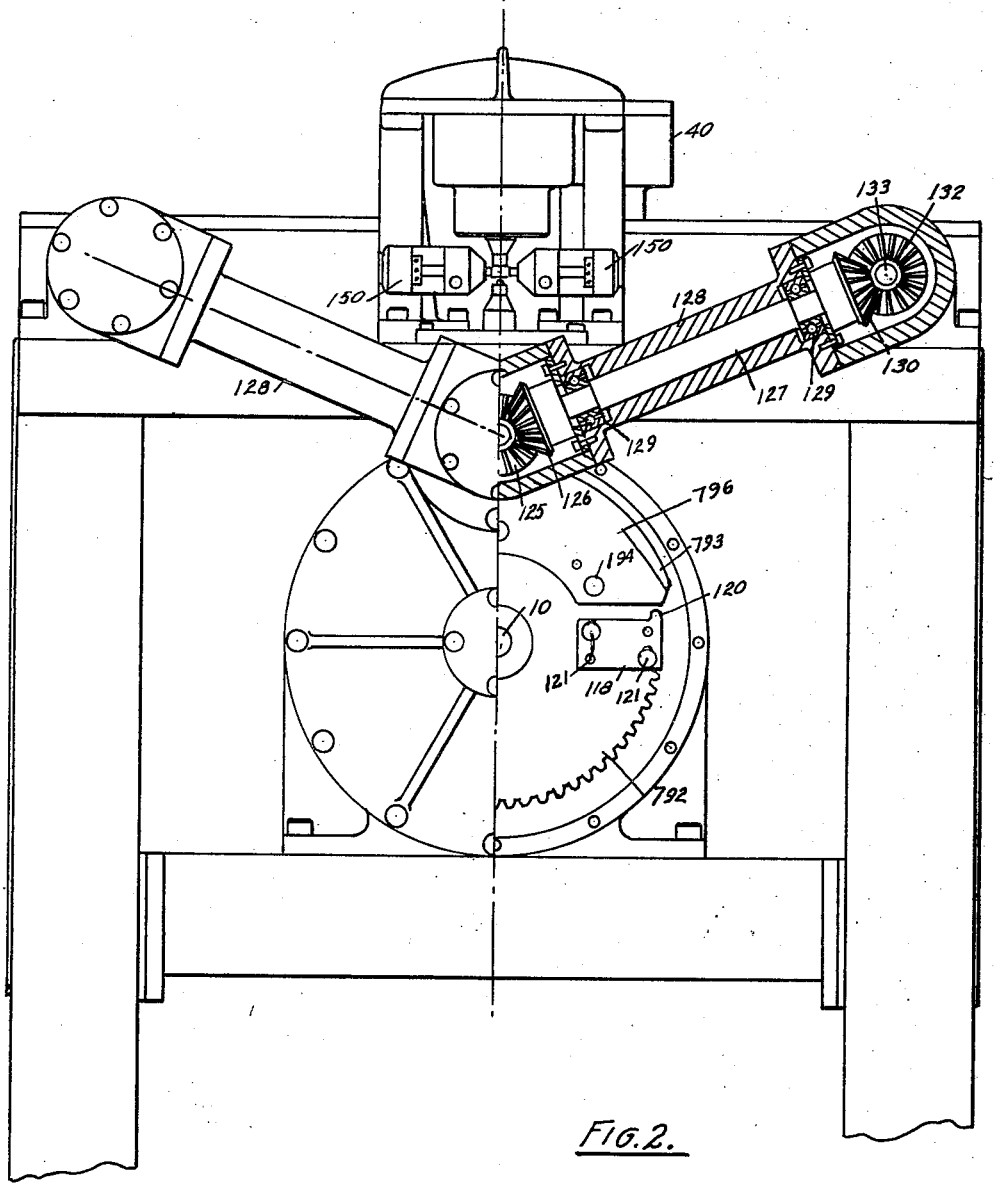
Fig. 2 is an end elevational view with parts broken away, of my novel machine.

I will now explain the operation of the cutters and the mechanism for intermittent operation thereof. Figs. 1, 2 and 4 to 8 inclusive show the cutters and operating mechanism therefor. The cutters 190 and 191 are operated from gear 792 fixedly mounted on the shaft 10. An arcuate shaped dwell member 793 as shown particularly in Figs. 2 and 16 is secured to the gear 792 by machine bolts 794. The dwell member 793 is adapted to engage laterally extending pins 795 on a cam member 115 mounted on the shaft 116 adjacent the gear 117 which meshes intermittently with the teeth of gear 792. As shown in Fig. 16, the period of dwell approximates 144 degrees of movement of the gear 792 or two-fifths of a revolution in which the teeth of gear 792 are not in mesh with the teeth of gear 117. In order to reduce the impact of the leading gear teeth at the beginning of each intermittent motion, due to the inertia of the driven gear 117 and the offset position at which tooth contact takes place, adjustable, rectangular shaped, impact reducing members 118 having elongated slots 119 and laterally extending engaging portions 120 are secured to the face of gear 792 by screw members 121 at each end of the dwell member 793. The projecting portions 120 of the members 118 move in the arcuate shaped, inwardly grooved portions 122 of the cam member 115 on the shaft 116. It will thus be evident that there will be no rotation of the shaft 116 for two-fifths of a revolutions of the gear 792 during the time that the pins 795 on cam member 115 engage the dwell member 793 on the gear 792.

The pins 795 ride the dwell member 793 as shown in Fig. 17. The ends 796 of the dwell member 793 are curved to correspond to the gyration of the pins 795 as motion is imparted to the gear 117. The shaft 116 is journalled in bearings 123 and 124 in side frames 15 and 17 and it has a bevelled gear 125 mounted on the outer end thereof. The bevelled gear 125 engages oppositely disposed, similar bevelled gears 126 which are mounted on shafts 127 which extend angularly outwardly from the shaft 116 at right angles thereto as shown in Fig. 2. The shafts 127 are disposed in casings 128 and they are journalled in bearings 129. The upper ends of the shafts 127 also have bevel gears 130 mounted thereon for engagement with bevelled gears 132 mounted on spaced, parallel, horizontally extending shafts 133. The shafts 133 are journalled in bearings 134 and they have mounted thereon cam members 135 with successive, arcuate shaped, connected cam surfaces 136 formed on the periphery thereof. Cam rollers 137 engage the cam members 135 and are mounted in yokes 138 forming a part of shafts 139 supported in frames 140 which are secured to table 141 by bolts 142. The bolts 142 extend through transverse, elongated slots 144 to permit sidewise adjustment of the frames 140. The frames 140 are generally U-shaped and a spring 143 is disposed between the flanged portions 131 of the shafts 139 and one leg of the frames 140.

Attached to each of the shafts 139 is a cutter chuck 150 for securing cutter member 190 or 191. A chuck 150 is shown particularly in Fig. 13. Each chuck 150 is split at 151 and the lower arcuate halves 152 thereof are secured to the upper halves 153 by machine bolts 154. The cutter members 190 and 191 are movable longitudinally by the rotation of the internally threaded cylindrical member 155 which has spaced recesses 156 for receiving a handle for rotation thereof. The member 155 threadably engages a threaded member 250 held against rotation by the off-set end 251 thereof engaging the member 252 disposed in a recessed portion 253 in the aperture 254 in the shaft 139. The cutter members 190 and 191 are received and held by the threaded members 250. The halves 152a are secured by screw bolts 154a. The cutters 190 and 191 are secured by the locking screws 154 against longitudinal movement. The member 155 has spaced transverse grooves on the periphery thereof for receiving a spring-urged finger 157 to lock it against rotation. The finger 157 is pivoted at 158 and a spring 159 urges the engaging portion 160 into engagement with the grooved periphery of the member 155. It will be evident upon inspection that the high points of the cams 19 and 20 will be in engagement with the cam rollers 87 to cause the members 78 to engage the gripping members 69 and 70 when the teeth of gear 792 engage the teeth of gear 117 during three-fifths of a revolution thereof thereby causing rotation of the cam members 135 and reciprocation of the cutters 190 and 191 in the chucks 150. The cutters 190 and 191 are reciprocated during the time that the wheels 78 rotate one-half revolution.

In Figs. 1, 12, 14 and 15, I show the means for feeding the wheels 78 along the track 75 in a predetermined sequence. Cam 18 on shaft 10 engages the cam roller 160 on arm 161 of bell crank 162 pivoted on shaft 163 and secured thereon by a nut 164 engaging a reduced threaded portion of the shaft 163. A torsion spring 165 urges the cam roller 160 into engagement with the cam 18 at all times. The upward movement of the cam arm 161 of bell crank 162 causes the rotational movement thereof thereby causing the ratchet member 166 pivotally secured to the upper end thereof by screw bolts 167 to engage the teeth 168 of a ratchet wheel 169. Ratchet member 170 is pivotally secured to support member 171 by machine bolt 172. Spring member 173 engages an arm 174 and an extension 175 of the ratchet member 170 to urge it into engagement with the ratchet teeth 168 of the ratchet wheel 169. A spring 176 is engaged to an arm 177 and an extension 178 of the ratchet member 166 to urge the ratchet 166 into engagement with the ratchet teeth 168 of the ratchet wheel 169. An anchored spring 179 engages the arm 177 to urge the ratchet wheel 160 forwardly. The ratchet wheel 169 is secured to vertically extending shaft 180 by locking screws 181 and a feeding wheel 182 is mounted on the upper end of the shaft 180. The feeding wheel 182 has adjacent, arcuate shaped, grooves 183 formed on the periphery thereof substantially the size of the wheels 78 to be fed along the track 75. The edge of the wheel 182 extends over the track 75 so as to selectively engage and move forward wheels 78 moving along the track 75. The shaft 180 has an enlarged head portion 184 which rests on the upper portion 185 of the cylindrical casing member 186. The cylindrical member 186 has an outwardly flanged, apertured portion 187 which is connected to the frame 188 by welding or any other suitable means.

Figure 15:
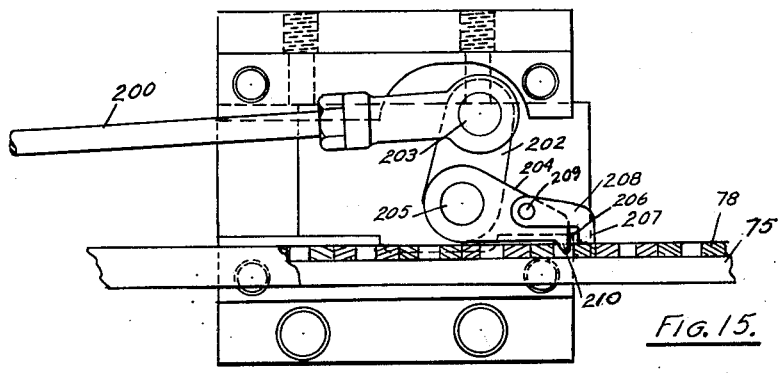
Fig. 15 is an enlarged fragmentary side elevational view showing the auxiliary feeding device for feeding the metal wheels along the track to the second station in my novel machine.

A bracket 291 is connected to the arm 161 by screw bolts 192 and a vertically extending bracket 193 having a turn buckle 194, is connected to the bracket 291 by a bolt and nut assembly 195 and to the bell crank 196 by a bolt and nut assembly 197. The bell crank 196 has an elongated slot 198 to permit adjustment of the upper end of the rod 193. The bell crank 196 is pivoted at 199 and an adjustable rod 200 is connected to the upper end of the bell crank 196 at 201. The outer end of the rod 200, shown particularly in Fig. 15, is connected to a depending bracket 202 by a pin 203, the bracket 202 being in turn connected to a freely pivotable member 204 by pin 205. The pivotable member 204 has a depending nose portion 206 which is spaced vertically and longitudinally from the lower end 207 of an L-shaped member 208 and secured to member 204 at 209. The depending portion 206 of the pivotable member 204 has a tapered portion 210 which permits the pivotable member 204 to move upwardly and backwardly over the wheels 78 in the track 75. The member 208 moves rearwardly together with the pivotable member 204 and it drops into the track 75 and engages and moves a wheel 78 upon the forward movement of the rod 200 when there is no wheel upon which it can ride. Thus, even though there is no wheel following, a wheel is moved forwardly to the second station of my machine.

A plate 220 (Fig. 1) is secured in grooved portions 221 in the members 80, and it has a central aperture 222 in which a sleeve 224 is secured. A spring 223 is disposed in the sleeve 224 and it rests on a threaded plug 228. A cap 225 is disposed on the upper end of the spring 223, the cap 225 being in engagement with a recess 226 in the frame 227. The spring 223 urges the engaging members 80 away from the gripping members 69 and 70.

In operation, upon the starting of the motor 2 and the rotation of the shaft 10, the rotatable gripping members 69 and 70 will be continuously operated through gears 23 and 29 on shaft 24, gears 32 and 42 on shaft 33, gear 44, and gears 45 and 46 in engagement with gear 44 and mounted on shafts 56 and 57. The gripping members 69 and 70 rotate with the shafts 56 and 57. The gripping members 69 and 70 are disposed a predetermined distance above the track 75 which extends therebeneath and in alignment therewith. The wheel engaging, freely rotatable vertically movable heads 106, one of which is shown in Fig. 11, are moved upwardly through the open portion of the track 75 to engage wheels 78 at two stations along the track 75 immediately beneath the gripping members 69 and 70 thereby forcing the wheels 78 against the rotating gripping members 69 and 70 whereby the wheels 78 are rotated therewith. The movable heads 106 move upwardly intermittently upon rotation of the shaft 10 and the cams 19 and 20, the movable heads 106 being moved upwardly to cause rotation of the wheel 78 during a period of approximately a three-fifths revolution of the cams 19 and 20 and shaft 10. The intermittent gear mechanism comprises gear 792 on shaft 10, gear 117, cam 115 on shaft 116, dwell sector 793 for engaging the pins 795 on cam 115 and shock members 118 on each end of the sector 793 on gear 112 to permit a minimum impact of the teeth upon engagement of the curved cam portion 122 of the cam 115 engaging the projecting portions 120 of the shock members 118 shown particularly in Figs. 16 and 17. It will thus be evident that the pins 795 on the cam 115 will move over the sector 792 and thereby no rotational force will be transmitted between the shaft 10 and the shaft 116 during the time that the sector 793 and the pins 795 on the cam 115 are in engagement which is a period of approximately two-fifths of a revolution of the shaft 110 and corresponding to the time that the wheel engaging members 106 are moved away from the track 78. The intermittent rotation of the shaft 116 causes intermittent rotation of the bevel gear 125 which in turn engages and rotates gears 126, shafts 127 and gears 130. Gears 130 in turn engage bevel gear 132 mounted on shafts 133, each of which has cams 135 mounted thereon. Thus, when the wheel engaging members 106 are moved upwardly to cause rotation of the wheels 78 at the two stations of the machine, the cams 135 are rotated thereby causing rapid reciprocating movement of the cutters 190 and 191 at the two stations of my machine. The cutting portions of the cutters 190 and 191 at the two stations are disposed in different angular relationships thereby permitting the cutting of cross grooves with any desired relative angular relationship. The depth of the grooves is adjusted by means of the adjusting wheels 155 in the chucks 157.

The operation of the feeding mechanism is as follows:

The cam 18 on the shaft 10 causes movement of the bell crank 162 which in turn causes the ratchet 166 to move the ratchet wheel 169 and shaft 180 clockwise through cooperation of the spring 179 thereby rotating the feeding wheel 182. Ratchet 170 prevents a backward movement of the ratchet wheel 169, shaft 180 and feeding wheel 182 and permits movement thereof only in one direction. The feeding wheel 182 rotates a predetermined amount upon each rotation of the cam 18 so that one wheel 78 moves to the first station of my machine. The upward movement of the bell crank 162 also moves the adjustable rod 193 upwardly thereby moving the bell crank 196 and causing reciprocating movement of the rod 200. The hinged pivotable member 204 moves with the rod 200 and engages a wheel 78 in the track 75 and moves them forwardly to the second station of my machine. The hinged member 204 is provided to drop into the track 75 to move a wheel 78 to the second station of my machine when the member 204 has no wheel upon which to ride.

Fig. 8a shows the cutters or die members 190 and 191 off-set from each other so as to engage the periphery of a wheel 180° from each other and approximately 15° from a transverse vertical plane passing through the center of a wheel. It has been found that by off-setting the cutters 190 and 191, they tend to force the metal on the periphery of a wheel outwardly somewhat like an undercutting operation thereby producing a better abrading surface than a coining operation with the cutters moving directly into the wheel at right angles to a tangent thereof.

The cutters strike the wheel simultaneously 180 degrees apart. The gearing of my machine is so selected as to impart cutting action to the cutters 190 and 191 during the period that the wheels 78 are rotated 180 degrees thereby causing each cutter to abrade one-half of the outer surface of the wheel 78. The surface 136 on the notching cams 135 may be altered to any suitable number of high points as long as opposing cams are the same. Changing of the high points on the cams 135 changes the tooth pattern formed on the wheels 78. By providing shortened cleats 73a as shown in Fig. 10b, small chips may readily move upwardly into the axial bore of the gripping member 69 or 70.

It will be evident from the foregoing description that I have provided a novel machine for cutting grooves on the periphery of a wheel at any desired predetermined angle and depth at different stations of a machine which are moved continuously through the machine automatically at a high rate of production.

Various changes may be made in the specific embodiment of my invention without departing from the spirit thereof or from the scope of the appended claims.

What I claim is:

1. A machine for forming an abrading surface on the peripheral surface of a wheel having a central concentric hole therein comprising a rotatable member for engaging one face of a wheel, an intermittent conveying device beneath said rotatable member for conveying wheels into a position in axial alignment with said rotatable member, a lifting member for raising said wheels upwardly from said conveying device into engagement with said rotatable member during a period of rest of said conveying device, said rotatable member engaging a side of the wheel concentric with the periphery thereof, said lifting member comprising a wheel engaging surface and a guiding pin extending from said wheel engaging surface to engage the hole in said wheels, rapidly reciprocating die members sidewise of said conveying device for impressing spaced diagonal grooves on the periphery of a wheel during the period of rotation thereof with said rotatable member, said die members being in opposed relation so that the impression on the wheel is in the form of cross hatching, and power means for operating said conveyor and rotating said rotatable member, rapidly reciprocatingly operating said die members and operating said lifting member.

2. The machine recited in claim 1 wherein the die members engage the periphery of said wheel diametrically opposite each other and are disposed at an acute angle to a transverse plane passing through the center of the wheel.

3. The machine recited in claim 1 wherein said die members comprise a plurality of pairs of diametrically opposed dies disposed at spaced points along said conveying device, one pair of said dies being disposed to impress said spaced grooves at an angle to the grooves impressed by another of said sets of dies whereby said grooves are formed in cross hatch relation.

4. The machine recited in claim 1 wherein said rapidly reciprocating die members comprise a plurality of camming surfaces and dwell means operably connecting said camming surfaces with said lifting member whereby said rapidly reciprocating die members are inoperative when said lifting member moves out of engagement with said wheels.

5. The machine recited in claim 1 wherein said intermittent conveying device comprises a feeding wheel rotatable in a plane parallel to the side face of said wheels to be abraded, said feeding wheel being rotatably mounted on said machine, said feeding wheel having a plurality of notches around the periphery thereof for engaging said wheels to be abraded, said feeding wheel being operatively connected to said power means and intermittently operated thereby.

References Cited in the file of this patent

UNITED STATES PATENTS

| Number | Name | Date |
| --- | --- | --- |
| 435,573 | Tyler | Sept. 2, 1890 |
| 530,213 | Tyler | Dec. 4, 1894 |
| 551,066 | Tyler | Dec. 10, 1895 |
| 579,746 | Etches | Mar. 30, 1897 |
| 632,862 | Arnold | Sept. 12, 1899 |
| 1,225,995 | Norris | May 15, 1917 |
| 1,327,994 | Gray | Jan. 13, 1920 |
| 1,619,971 | Dean | Mar. 8, 1927 |
| 2,455,348 | Barstow | Dec. 7, 1948 |